May 1, 1962 R. A. FINDLAY 3,031,880
CONTINUOUS CLOUD POINT DETECTOR
Filed Jan. 17, 1958 4 Sheets-Sheet 1
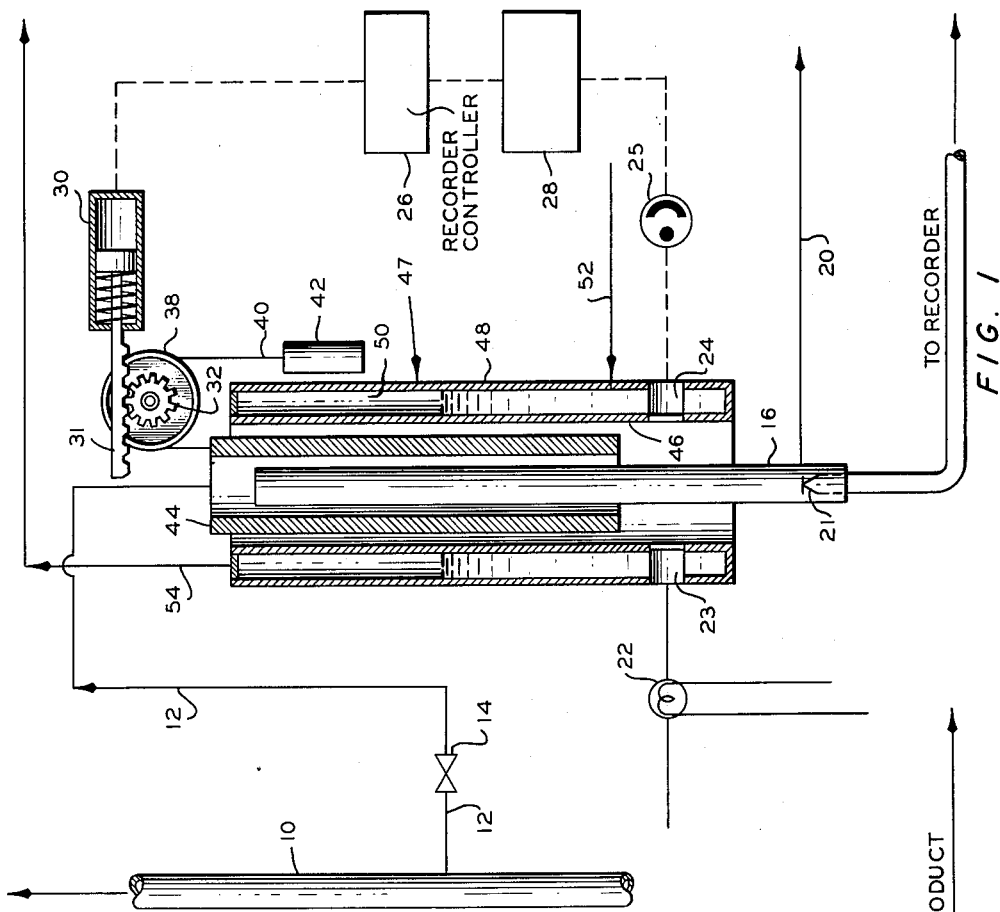
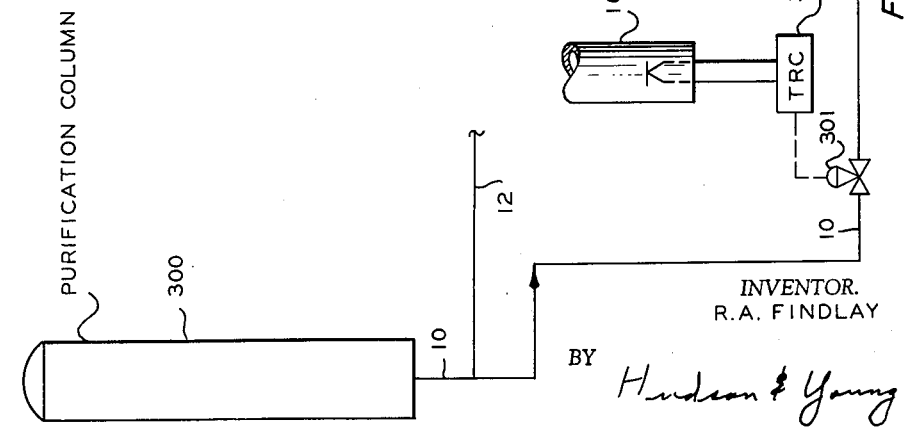
INVENTOR.
R.A. FINDLAY
BY *Hudson & Young*
ATTORNEYS May 1, 1962  R. A. FINDLAY  3,031,880
CONTINUOUS CLOUD POINT DETECTOR
Filed Jan. 17, 1958  4 Sheets-Sheet 2

INVENTOR.
R.A. FINDLAY
BY Hudson & Young
ATTORNEYS

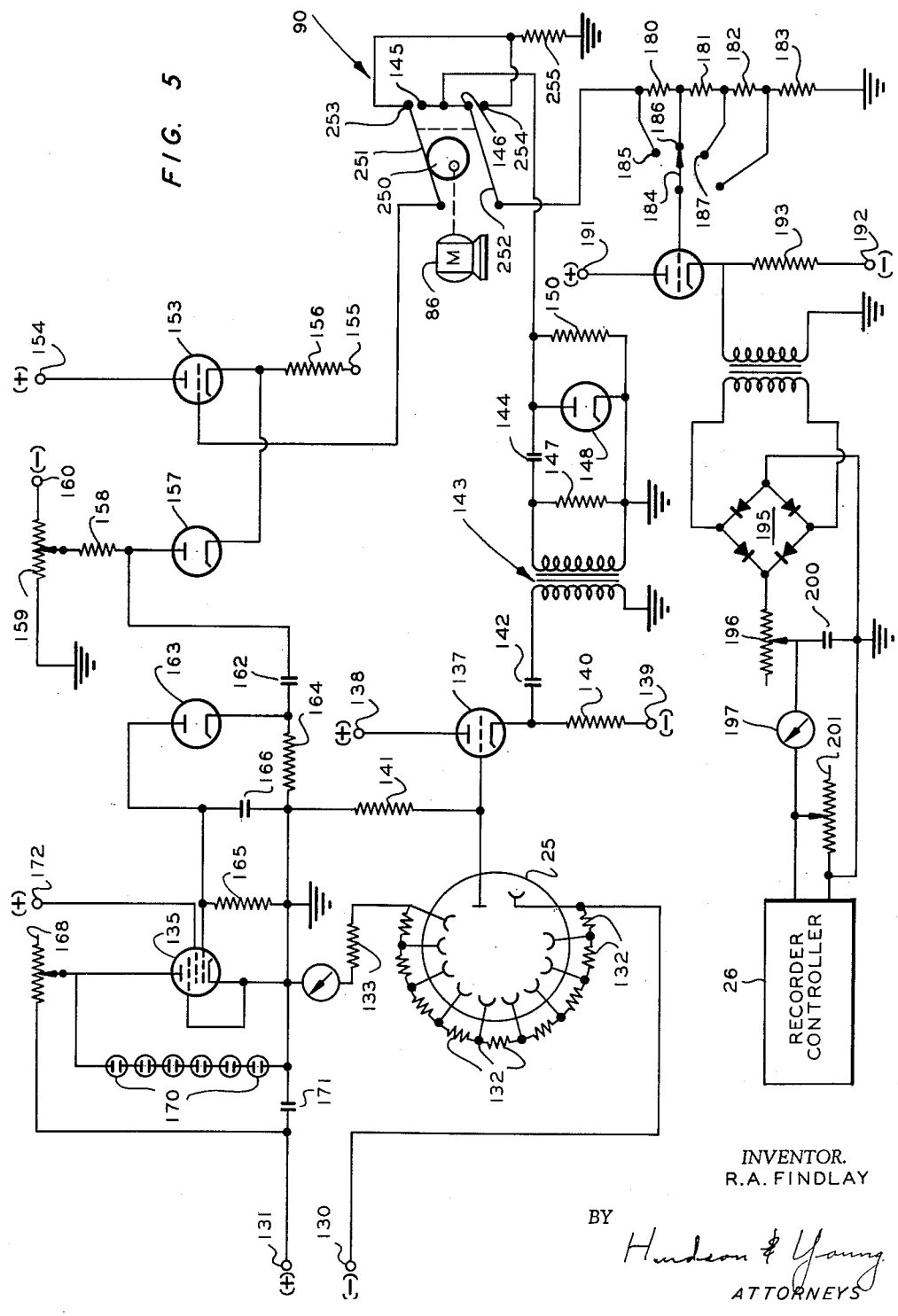

May 1, 1962 R. A. FINDLAY 3,031,880
CONTINUOUS CLOUD POINT DETECTOR
Filed Jan. 17, 1958 4 Sheets-Sheet 4

INVENTOR.
R.A. FINDLAY
BY Hudson & Young
ATTORNEYS

United States Patent Office 3,031,880
Patented May 1, 1962

3,031,880
CONTINUOUS CLOUD POINT DETECTOR
Robert A. Findlay, Bartlesville, Okla., assignor to Phillips Petroleum Company, a corporation of Delaware
Filed Jan. 17, 1958, Ser. No. 709,631
13 Claims. (Cl. 73—17)

This invention relates to apparatus for measuring a property of materials. In one aspect it relates to apparatus for continuously determining the freezing point of fluids.

With the increasing development of the chemical industry there has been a parallel development in the demand for high purity chemicals. Some of these chemicals are extremely difficult to separate from the mixtures in which they normally occur. Examples are: separation of para-xylene from other xylene isomers; recovery of durene (1,2,4,5 tetramethyl benzene) from an aromatic petroleum solvent; and recovery of high purity benzene, naphthalene, normal paraffins, cyclohexane, and similar hydrocarbons from mixtures containing the same.

Parallelling the problems in separation has been the problem of how to determine the purity of the product obtained. One technique is to determine purity by the freezing point i.e. by the cloud point of a liquid-solid solution at equilibrium. One difficulty with this is that formation of crystals or solids, respectively, makes it difficult to continuously determine the purity by freezing a sample of the material being tested. Continuous determination of the purity of the product as it is produced is considered essential where a continuous process is used to obtain one of these high purity products.

The present invention provides apparatus for continuously determining cloud or freezing points and which permits easy handling of a solution containing crystals. In essence, the sample being tested is brought down to the freezing point (or cloud point) but only a certain amount of crystallization is permitted to occur. This is accomplished through controlling the amount of refrigeration applied to the test sample by means of shielding the test sample from the refrigeration. The turbidity of the crystal-containing solution is maintained constant and the measurement of turbidity is used to control the amount of refrigeration applied. Inasmuch as the sample being tested is at equilibrium conditions, if the temperature is measured while holding the turbidity constant, such a temperature will be the freezing temperature of the sample. Once this temperature is obtained it can then be determined if the product is of the desired purity. Such an apparatus also represents an improvement in means for analysis and process control as disclosed in co-pending application by Dale E. Lupfer, No. 613,289, filed October 1, 1956, entitled "Ammonium Nitrate Analysis and Control."

Accordingly, it is an object of this invention to provide apparatus to detect the cloud point of fluids. It is a further object to provide apparatus for continuously detecting freezing points of fluids. Other objects and advantages will become apparent from the following description and claims.

In the drawings:

FIGURE 1 represents a vertical cross section of elements of the invention with the associated apparatus shown schematically;

FIGURE 5 shows a schematic circuit diagram of the electrical components of the radiation comparing means;

Figure 6:
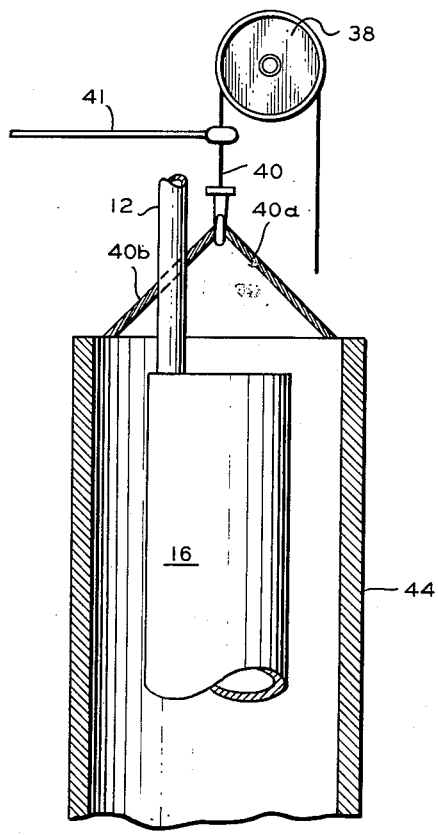
Figure 8:
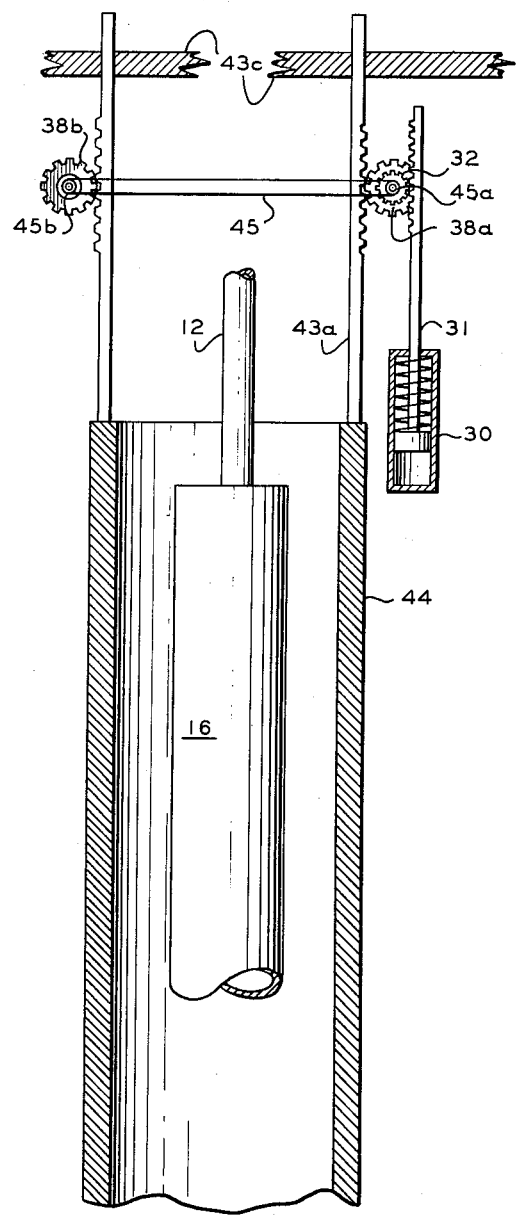
Figure 7:
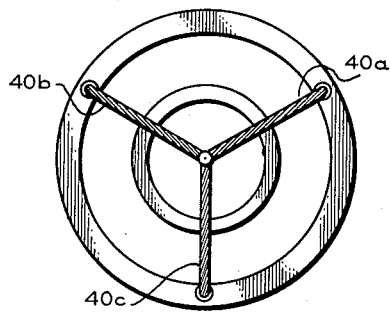

FIGURES 6, 7, and 8 show details of the position apparatus for the thermo insulator;

FIGURE 9 is a partial view that shows the arrangement of elements for use in a control system.

Referring now to FIGURES 1, 2, 3 and 4, the conduit 10 represents a pipe in which a stream of the fluid to be tested is flowing. A sample line 12 having a sample valve 14 therein is connected at one end to the conduit 10. The other end of the sample line 12 connects to a sample cell 16, the construction of which is shown in detail in FIGURE 3 and which will be hereinafter discussed. Outlet line 20 removes the sample stream from the sample cell 16. Adjacent the outlet is a thermocouple 21 which may be connected to a recording apparatus (not shown). In lieu of a thermocouple, a resistance thermometer, preferably platinum, could be used.

In the preferred embodiment, the radiation source 22 emits visible light which is transmitted through the port 23, sample cell 16, and port 24 to a photoelectric cell 25. The photoelectric cell, in the preferred embodiment, is a photomultiplier tube. The ports 23 and 24 will be hereinafter described with relation to their associated structure. The photomultiplier tube is connected to a recorder-controller 26 through the amplifying and comparing circuit assembly 28, in the manner shown in FIGURE 5, to be hereinafter described. The recorder controller is preferably one with a pneumatic output, such as a Brown "Electronik" air-o-line potentiometer controller as disclosed in the specification sheet No. 175 published in May 1951. Control air is directed by the controller to a pneumatic motor 30 having a linear motion output such that rack 31 moves, thereby to cause gear 32 to rotate and to cause rotation of the pulley 38.

As shown, a wire or cable 40 passes over the stepped pulley 38 and has a counter weight 42 on one end and a retractable thermal insulator 44 suspended from the other end.

As seen in FIGURES 6 and 7, a yoke assembly is provided in order that the insulator 44 be maintained in radial and vertical alignment. The yoke comprises three cable portions, 40a, 40b, and 40c of equal length, spaced 120° apart and secured to the insulator 44. The aforesaid cable portions are secured at a common point to the cable 40. In the preferred embodiment a cable guide 41 is provided to maintain the cable centered. In this embodiment it is necessary to dispose inlet line 12 off-center of sample cell 16 to avoid mechanical interference with the yoke assembly.

Another means for positioning and supporting the insulator 44 is shown in FIGURE 8. The motor 30 drives gear 38a through gear 32 in the same manner as the pulley 38 is driven in FIGURE 1. A belt 45 runs off of pulleys 45a and 45b that are integral with gears 38a and 38b, respectively, and causes both of the latter to turn at the same peripheral velocity. The gears engage racks 43a and 43b, respectively. Racks 43a and 43b, are connected to the insulator 44 at one end and on the other end have extensions that slidably engage guides 43c. Two gears 38a and 38b are disposed in such a manner as to equalize radial gear forces.

Figure 3:
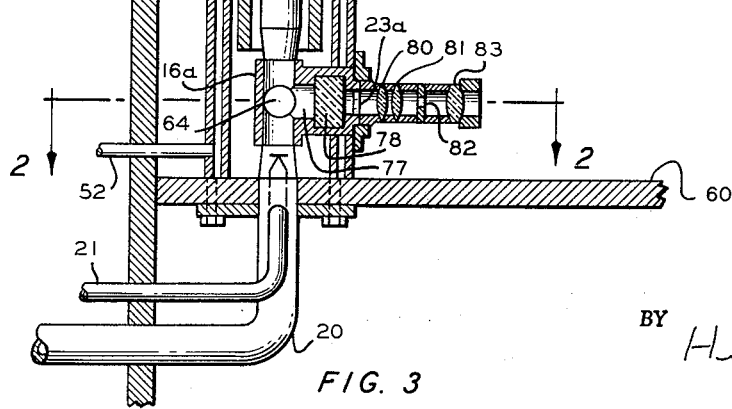
FIGURE 3 shows in detail a cross section of the sample cell.

Referring now to FIGURES 1 and 3, the insulator 44 operates as a thermal shielding means and is disposed between the sample cell 16 and the inner wall 46 of a cooling jacket assembly 47. The insulator 44 is preferably a double-walled, vacuum-insulated sleeve.

The cooling jacket is completed by the outer wall 48 which forms a coolant space 50 with the wall 46. Coolant or other heat exchange fluid may be fed into the space 50 through the inlet 52 and removed therefrom by the outlet 54. The cooling jacket assembly 47 may be the evaporator of a mechanical refrigeration system if desired. In addition, the assembly 47 includes ports 23, 23a, and 24 through which light is transmitted from the source 22 to the photoelectric cell 24.

The elements denoted as 16, 44, and 47 are preferably concentrically disposed and annular in cross-section.

Figure 2:
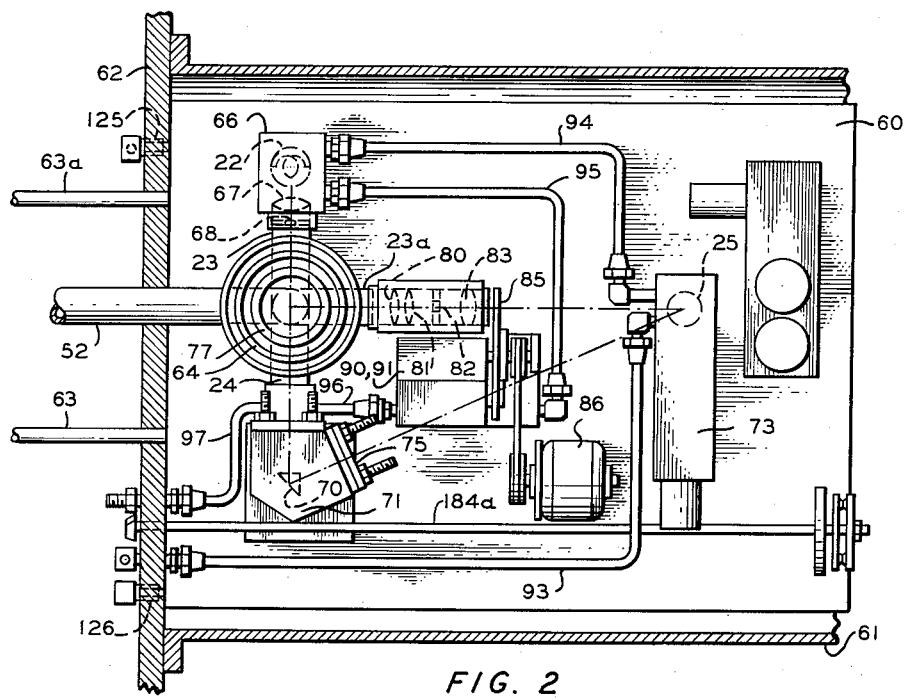
FIGURE 2 is an arrangement of the optical system including a section through 2—2 of FIGURE 3.

Referring now to FIGURE 2, a base plate 60 is provided on which the apparatus of FIGURE 1 and some of the associated apparatus as hereinafter described is arranged. Surrounding the entire apparatus mounted thereon is a cylindrical cover 61 which is secured to a panel 62. The recorder-controller 26 is preferably mounted outside of this cover. The cover is provided as an air-tight means surrounding the apparatus mounted on the base plate 60 because it is desired to keep out atmospheric air which ordinarily contains water vapor and dirt. The dirt would affect the operation of the optical components of the system. The water vapor will condense and possibly even freeze when temperatures below the dew point are produced by the fluid flowing through jacket 47. Obviously, such condensation and freezing will affect the optical components and will alter the heat transfer characteristic of the instrument proper. Consequently, the air-tight means is provided to obviate these problems. In addition, a connection 63 is provided whereby dry nitrogen may be admitted inside the container after air has been removed through a like connection 63a. If desired, a vacuum pump may be connected to 63a to initially remove air. It is preferred to maintain a slight positive pressure of dry nitrogen in order to prevent air from leaking into the apparatus through undiscovered leaks.

In order to maintain the accuracy of the system and so that the apparatus will not accrue error due to dirt accumulating on the lenses or the photoelectric system aging, it is desired to constantly correct the system for such deteriorating effects. Consequently, an optical system and a gain control system, such as disclosed in copending application No. 589,242 filed June 14, 1956, by E. J. Marak and H. W. Staten, Jr., entitled "Nephelometer," is associated with the apparatus of FIGURE 1. The preferred details to accomplish this are shown in FIGURES 2, 3, 4, and 5.

As seen in FIGURES 2 and 3, it is necessary for the sample cell 16 and the jacket 17 to have three ports for transmitting light. To accomplish this, the ports 23, 23a, and 24 are provided in the jacket assembly 47. These ports are in optical registration with light transmitting means mounted in block 16a, the latter being a portion of the same cell 16. The block 16a is provided with a first passage in full registration with sample cell 16 and a second passage 64 which communicates therewith at right angles thereto. The passage 64 is in optical registration with the ports 23 and 24. A beam of radiation is directed through passage 64 and through the sample fluid circulated through sample cell 16. This radiation beam is produced by a light source 22 which is mounted in a housing 66. Radiation from source 65 is collimated by a lens 67 and passed through an aperture 68 so that a narrow beam is directed through passage 64. The radiation transmitted through passage 64 and the fluid sample is reflected by a prism 70 to impinge upon a radiation detector 25, such as a photomultiplier tube. Prism 70 is mounted in a housing 71 and detector 25 is mounted in a housing 73. One or more attenuators 75 are positioned in the beam to reduce the intensity. A portion of the radiation beam directed through sample cell 16 is scattered by the solid particles entrained in the sample fluid and emerges from block 16a through a passage 77 which is in optical registration with the port 23a. A window 78 prevents leakage of fluid from passage 77. This scattered radiation beam is focused by lenses 80 and 81 through an aperture 82. The beam transmitted through aperture 82 is focused by lens 83 on detector 25.

Figure 4:
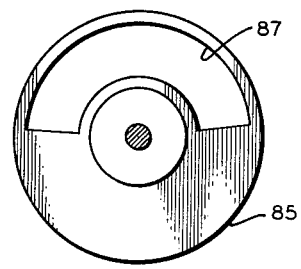
FIGURE 4 shows the chopper that is rotated in the transmitted and scattered light beams.

A chopper disc 85 is rotated in the two radiation beams at a predetermined speed by means of a motor 86. This disc, which is illustrated in detail in FIGURE 4, is provided with an annular slot 87 which extends nearly 180° so that each radiation beam is alternately blocked by and transmitted through the disc. Detector 25 thus receives radiation from the two beams alternately. A mechanical switch 90 is also actuated by a motor 86 so that the output signal from detector 72 is connected to one of two circuits depending upon which beam is received by the detector. The operation of this switch is described in detail hereinafter. Switch 90 and the electrical components associated therewith are mounted in a housing 91.

In order to maintain the operation of the optical and electrical components of the analyzer uniform, it is necessary that these components not be overheated nor overcooled. This is accomplished by circulating a heat transfer fluid, such as water, through cylinder 61. The water enters cylinder 61 through panel 62 and is directed by a conduit 93 to housing 73, then circulates through a passage in housing 73 and is directed therefrom through a conduit 94 to housing 66. It then circulates through a conduit in housing 66 and is then directed through a conduit 95 to housing 91. The water circulates through a conduit in housing 91 and is then directed through a conduit 96 to housing 71 where it circulates through a conduit in housing 71 and is vented through a conduit 97 which passes out of cylinder 61 through panel 62. This circulating water maintains the analyzer at a proper operating temperature. Where extremely low temperatures are necessary for crystallization, it may be necessary to circulate warm water instead. If the crystallization temperature is below the freezing point of the water or heat transfer fluid, an anti-freeze should be added.

The electrical circuit associated with photomultiplier tube 25 is illustrated in FIGURE 5. The cathode of tube 25 is connected to a potential terminal 130 which is negative with respect to a second potential terminal 131. A resistor 132 is connected between the cathode of tube 25 and the adjacent dynode. Similar resistors are connected between the other adjacent dynodes. The dynode adjacent the anode is connected through a resistor 133 and a current meter 134 to ground. The anode of tube 25 is connected to the control grid of a triode 137. The anode of triode 137 is connected to a positive potential terminal 138, and the cathode of triode 137 is connected to a negative potential terminal 139 through a resistor 140. The control grid of triode 137 is connected to ground through a resistor 141. The cathode of triode 137 is also connected through a capacitor 142 to the first terminal of the primary winding of a transformer 143. The second terminal of the primary winding is connected to ground. The first terminal of the secondary winding of transformer 143 is connected through a capacitor 144 to first switch contacts 145 and 146. The second terminal of the secondary winding of transformer 143 is connected to ground. A resistor 147 is connected in parallel with the secondary winding of transformer 143. The anode of a diode 148 is connected to switch 145. The cathode of diode 148 is connected to ground. A resistor 150 is connected in parallel with diode 148.

Motor 86 rotates a cam 250 between switch blades 251 and 252. This moves blades 251 and 252 into engagement with respective contacts 145 and 146 alternately. Blades 251 engages a contact 253 when blade 252 engages contact 146, and blade 252 engages a contact 254 when blade 251 engages contact 145. Contacts 253 and 254 are connected to ground through a resistor 255. The blades engage each of their contacts during approximately one-half of a cycle of rotation of cam 250. Blade 251 is connected to the control grid of a triode 153. The anode of triode 153 is connected to a positive potential terminal 154, and the cathode of triode 153 is connected to a negative potential terminal 155 through a resistor 156. The cathode of triode 153 is also connected to the cathode of a diode 157. The anode of diode 157 is connected through a resistor 158 to the contactor of a potentiometer 159. One end terminal of potentiometer 159 is connected to ground, and the second end terminal is connected to a negative potential terminal 160. The anode of diode 157 is connected through a capacitor 163 to the cathode of a diode 163. The anode of diode 163 is connected to the control grid of pentode 135. The cathode of diode 163 is connected to ground through a resistor 164.

A resistor 165 and a capacitor 166 are connected in parallel with one another between the control grid of pentode 135 and ground. The anode of pentode 135 is connected through a variable resistor 168 to terminal 131. A number of series connected gas-filled discharge tubes 170 are connected between the anode of pentode 135 and ground. A capacitor 171 is connected between terminal 131 and ground. The screen grid of pentode 135 is connected to a positive potential terminal 172, and the suppressor grid of pentode 135 is connected to the cathode thereof. The cathode of pentode 135 is connected to ground.

Blade 252 is connected to ground through series connected resistors 180, 181, 182 and 183. A gain selector switch 184 is adapted to engage terminals 185, 186, 187 and 188 selectively. Switch 184 is operated by an arm 184a, see FIGURE 2. Terminal 185 is connected to blade 252; terminal 186 is connected to the junction between resistors 180 and 181; terminal 187 is connected to the junction between resistors 181 and 182; and terminal 188 is connected to the junction between resistors 182 and 183. Switch 184 is connected to the control grid of a triode 190. The anode of triode 190 is connected to a positive potential terminal 191, and the cathode of triode 190 is connected to a negative potential terminal 192 through a resistor 193. The cathode of triode 190 is also connected to one end terminal of the primary winding of a transformer 194. The second end terminal of the primary winding is connected to ground. The secondary winding of transformer 194 is connected across first opposite terminals of a full wave rectifier bridge 195. The third terminal of bridge 195 is connected through a variable resistor 196 and a current meter 197 to the first input terminal of a recorder-controller 26. The fourth terminal of bridge 195 is connected to ground. A capacitor 200 is connected between ground and the junction between resistor 196 and meter 197. A variable resistor 201 is connected between ground and the junction between meter 197 and the first input terminal of the recorder-controller 26. The second input terminal of the recorder-controller 26 is connected to ground.

Cam 250 is synchronized with chopper disc 85 so that switch blade 251 engages contact 145 when the radiation beam reflected from prism 70 impinges upon tube 72. Switch blade 252 engages contact 146 when the scattered radiation beam is directed upon tube 25. The ratio of the scattered beam to the transmitted beam is a function of the solid particles in the fluid sample. When the scattered beam impinges upon tube 25, the output signal therefrom is applied through cathode follower 137, transformer 143 and switch blade 252. Diode 148 serves as a negative clamp. The signal is applied from switch blade 252 through cathode follower 190 and transformer 194 to rectifier 195. The rectified signal is filtered by resistor 196 and capacitor 200 and applied to the input of recorder-controller 26. The amplitude of this signal is a function of the solid particles in the fluid sample.

It is desired to maintain the reference beam (23—70—25) signal relatively constant. Variations in this can be caused by changes in turbidity and by fluctuations in intensity of the light beam emitted from source 65. Compensation is accomplished when the transmitted beam is alternately directed upon tube 25. During these half cycles, the output signal from tube 25 is applied through switch blade 251 to the input of cathode follower 153. The output of cathode follower 153 is transmitted through a clipper 157 and a bias rectifier 163 to the control grid of pentode 135. If the transmitted beam should increase in intensity, the magnitude of the negative potential applied to the control grid of pentode 135 is increased to decrease conduction therethrough. This results in the dynode potentials of the tube 25 becoming less negative so that the gain of the tube is diminished by an amount sufficient to compensate for the original change in intensity of the radiation beam. If the radiation beam should decrease in intensity, the potentials are changed in the reverse manner to increase the net gain of the photomultiplier tube. Thus, the output signal applied to recorder-controller 26 is representative solely of the solid particles of the fluid sample. The instrument 26 can be a conventional potentiometer-controller wherein an input electrical signal is converted into a corresponding output pneumatic pressure.

FIGURE 9 shows the arrangement of components when it is desired to control a purification column in response to the purity as determined by the freezing point. As shown schematically in the drawing, the elements are arranged substantially as in FIGURE 1 with the conduit 10 acting as the low melting product line out of the column 300. In the conduit 10 downstream of the sample point is disposed a valve 301 which is controlled by a temperature recorder-controller 302. If the product is below the desired purity, the valve 301 is moved toward a closed position responsive to the temperature (purity) measurement.

The operation will now be described by following a sample through this instrument from the time it leaves the conduit 10. The sample first passes as part of a continuous stream into the upper part of the sample cell 16 and progresses downwardly through the sample cell. During its passage through the sample cell, the sample is progressively cooled until crystals form. Since the apparatus operates continuously, these crystals are washed on through with an unfrozen part of the original sample. To accomplish this the percent or fraction of any given sample that is frozen is controlled.

This control is achieved by measuring the turbidity which is an accurate, proportional index of the percent of solids (i.e., crystals that are frozen out) of the solution and then using the turbidity measurement to control the refrigeration to which the sample under consideration is subjected. As shown in FIGURE 1, the control is accomplished by passing light from the light source 22 through the ports 23, 24 and in through the block 16a of the sample cell. The amount of light that is transmitted through portion 18 of the sample cell is an index of the turbidity, i.e., the amount of frozen matter, of the solution. The photoelectric cell 25 senses the amount of this transmitted light and sends a signal into the amplifier assembly 28. This signal is then amplified and then measured in recorder controller 26 wherein an output signal is produced and is transmitted through the connection 30 to actuate the motor 34 which then positions the insulator 44. When I refer to a "means to measure" I refer to a combination of elements such as 25, 28, and 26 that carries out this sensing and controlling function as has been described. Also, when I refer to "means to shield" or "means for varying the heat exchange surface" I refer to the insulator 44, or its equivalent and the associated equipment which enables positioning it with respect to the sample cell. In this manner the amount of crystals formed is maintained at a predetermined control point by controllably shielding the sample cell (and the sample stream passing therethrough) from the refrigeration supplied to the cooling jacket 47.

Now that the sample being discussed has been subjected to cooling in such a manner as to prevent more than a certain amount solidifying, the saturation temperature is measured by the thermocouple 21. Once the freezing temperature is determined, the operator can readily determine whether or not the product is of the purity desired. If desired, the recorder can record the purity directly, instead of the temperature. Also, this apparatus may be used to measure other than freezing points, for example, cloud points of lubricants.

I do not intend to be limited only to the subject matter shown herein but regard as my invention all the changes and modifications which would be apparent to one skilled in the art. For example, infrared, vacuum ultraviolet, or ultraviolet, i.e. other types of electromagnetic radiation than visible light could be used. Further, it may be desirable to arrange a scraper inside the sample cell if the solution being handled produces crystals that build up on and adhere to the walls. Also, various types of raidation detecting, amplifying and comparing circuits may be used.

I claim as my invention:

1. Measuring apparatus suitable for use in continuously measuring the cloud point of fluid in a sample stream, comprising a sample cell having an inlet, an outlet, and at least a portion of the sample cell having transparent walls; a fluid flow passage in said cell extending from said inlet, through said transparent portion, and to said outlet; a hollow jacket surrounding and spaced from said sample cell; means for supplying heat exchange fluid to and withdrawing heat exchange fluid from said hollow jacket; a thermal insulator disposed between said hollow jacket and said sample cell; a light source; a photoelectric cell mounted adjacent said transparent portion thereby to receive light from said light source that has passed through said transparent portion; and means to support said thermal insulator and to move same in response to the light received by said sample cell, thereby to vary the surface of the sample cell that is exposed to said hollow jacket thereby maintaining the light passed through said transparent portion substantially constant.

2. Measuring apparatus suitable for use in continuously measuring the cloud point of fluid in a sample stream, comprising a sample cell having an inlet, an outlet, and a first heat exchange surface; at least a portion of said sample cell being transparent; a fluid flow passage in said cell for conductig a fluid in series from said inlet through said transparent portion to said outlet; a second heat exchange surface spaced from and surrounding said first heat exchange surface; means to pass radiation through said transparent portion; means to receive and measure the amount of radiation passing through said transparent portion; and means for varying the amount of said first heat exchange surface that is exposed to said second heat exchange surface in response to the radiation impinging on said means to receive and measure, thereby maintaining the radiation impinging on said means to receive and measure substantially constant.

3. Apparatus for continuously measuring the cloud point of fluid in a sample stream comprising a sample cell having a passage therethrough for conducting a sample stream through a cooling zone then through a light-transmitting zone; a cooling jacket spaced from and surrounding said cooling zone of said sample cell; a source of light; a photoelectric cell disposed to receive light transmitted through said light transmitting zone from said light source; a retractable insulator disposed in the space between said sample cell and said cooling jacket; means to position said insulator responsive to the light received by said photoelectric cell thereby to maintain substantially constant the light received by said photoelectric cell.

4. The apparatus of claim 3 wherein said means to position includes a recorder-controller having input terminals and providing a pneumatic output signal, means connecting said input terminals to said photoelectric cell, a pneumatic motor, means connecting said recorder-controller amplifier pneumatic output to said motor, and means connecting said motor to said insulator.

5. The apparatus of claim 4 further comprising a gas-tight cover, all of the apparatus except the recorder-controller being gas-tightly sealed therein.

6. Apparatus for continuously measuring the cloud point of fluid in a sample stream comprising a sample cell having a passage therethrough for conducting a sample stream through a cooling zone then through a light-transmitting zone; a cooling jacket spaced from and surrounding said cooling zone of said sample cell; a source of light; a photoelectric cell disposed to receive light transmitted through said light transmitting zone from said light source; a retractable insulator disposed in the space between said sample cell and said cooling jacket; means to position said insulator responsive to the light received by said photoelectric cell thereby to maintain substantially constant the light received by said photoelectric cell; and a temperature measuring device adjacent said light transmitting zone to determine the temperature of the fluid in said sample cell, the amount of light transmitted through said light transmitting zone being a function of a temperature responsive characteristic of the fluid in said sample cell.

7. Measuring apparatus suitable for use in continuously measuring the cloud point of fluid in a sample stream comprising a sample cell having a passage for fluid therethrough, heat exchange means to vary the temperature of a fluid as it flows through the passage in said cell, means to transmit a beam of radiation through at least a portion of the passage in said sample cell, measuring means to measure the transmitted radiation, and means responsive to said measuring means to variably shield said sample cell from said heat exchange means to maintain the transmitted radiation substantially constant, the amount of radiation transmitted being a function of a temperature responsive characteristic of the fluid in said sample cell.

8. Measuring apparatus comprising a sample cell having an inlet, an outlet, a portion of said sample cell forming a heat exchange portion, at least a portion of said sample cell providing a radiation transmissive path, a fluid flow passage in said sample cell for conducting a fluid in series from said inlet, past said heat exchange portion of said sample cell, and through said radiation transmissive path portion of said sample cell to said outlet; a heat exchange surface spaced from and surrounding said heat exchange portion of said sample cell; a radiation source, a radiation measuring means mounted to receive radiation that has passed through said radiation transmissive path portion from said source, and means for varying the extent of said heat exchange portion of said sample cell that is exposed to said heat exchange surface in response to the radiation measured by said radiation measuring means to maintain the radiation measured by said radiation measuring means substantially constant.

9. The apparatus of claim 8 further including temperature measuring means mounted adjacent the outlet to determine the temperature of the fluid in said sample cell, the amount of radiation passed through said radiation transmissive path portion being a function of a temperature responsive characteristic of the fluid in said sample cell.

10. The apparatus of claim 8 wherein said means for varying includes an insulator movably disposed between said heat exchange portion of said sample cell and said heat exchange surface.

11. The apparatus of claim 8 wherein said radiation source comprises means for emitting electromagnetic radiation in the range from infrared through ultraviolet.

12. Measuring apparatus comprising a sample cell having a passage for fluid therethrough, at least a portion of said passage providing a radiation transmissive path, heat exchange means surrounding said sample cell to remove heat therefrom, means to pass a beam of radiation through said radiation transmissive path portion of said passage, measuring means for measuring the radiation transmitted through said radiation transmissive path portion of said passage; a movable thermal insulator surrounding said sample cell between said heat exchange means and said sample cell, means responsive to said measuring means to move said movable thermal insulator to vary the extent of said sample cell that is exposed to said heat exchange means, thereby maintaining radiation transmitted through said radiation transmissive path portion substantially constant.

13. Measuring apparatus comprising a sample cell having an inlet, an outlet, a portion of said sample cell forming a heat exchange portion; at least a portion of said sample cell providing a radiation transmissive path, a fluid flow passage in said sample cell for conducting a fluid in series from said inlet, past said heat exchange portion and through said radiation transmissive path portion to said outlet; a heat exchange surface spaced from and surrounding said heat exchange portion of said sample cell; a radiation source; a photoelectric cell mounted to receive radiation that has passed through said radiation transmissive path portion from said source; an insulator movably disposed between said heat exchange portion and said heat exchange surface; and means for varying the extent of said heat exchange portion that is exposed to said heat exchange surface, said means for varying comprising means for positioning said insulator with respect to said heat exchange portion and said heat exchange surface in response to the radiation impinging on said photoelectric cell to maintain the radiation impinging on said photoelectric cell substantially constant, and temperature measuring means mounted adjacent said outlet to determine the temperature of the fluid in said sample cell.

References Cited in the file of this patent

UNITED STATES PATENTS

| | | |
|---|---|---|
| 1,947,821 | Alleman et al. | Feb. 20, 1934 |
| 2,104,525 | Proskouriakoff | Jan. 4, 1938 |
| 2,349,482 | Welty | May 23, 1944 |